Patented Nov. 27, 1934

1,982,241

UNITED STATES PATENT OFFICE 1,982,241

PROCESS FOR REMOVING SODIUM HYDROXIDE FROM MIXTURES THEREOF WITH POTASSIUM HYDROXIDE

Charles Julian Aydelotte, Wilmington, Del., Waldo R. Caverly, Carneys Point, N. J., and Walter H. Wright, Wilmington, Del., assignors to E. I. du Pont de Nemours & Company, Wilmington, Del., a corporation of Delaware No Drawing. Application March 30, 1933, Serial No. 663,650

9 Claims. (Cl. 23—184)

This invention relates to the removal of caustic soda from solutions containing a mixture thereof with caustic potash. More particularly, it relates to a process for maintaining the proper ratio in the mixture of caustic alkalis used in the commercial production of indigo.

In the manufacture of indigo, a mixture of the sodium and potassium salts of phenylglycine is fused in an autoclave with sodamide and a substantially anhydrous mixture of sodium and potassium hydroxides to form indoxyl. When the reaction is complete, the mass is drowned in water with the simultaneous oxidation of the indoxyl to indigotine, usually by means of air. The indigotine, being insoluble, is filtered off, washed and put in suitable condition for sale, while the caustic alkali contained in the filtrate is recovered for re-use in the process.

However, the recovered mixture of sodium and potassium hydroxides, commonly referred to as mixed caustic, contains an excess of caustic soda and, since the ratio of caustic soda to caustic potash must be carefully controlled for the successful and economical manufacture of indigo, it becomes necessary to remove a portion of the caustic soda in order to maintain the proper ratio in the system.

Heretofore, this has been accomplished by treating the indigo filtrate with carbon dioxide or a gas containing carbon dioxide, such as, for example, flue gas or fermentation gas, in order to convert a portion of the caustic soda to carbonate. The solution is then concentrated by evaporation to about 50° Bé. and cooled to 50° C., whereupon the sodium carbonate, together with small amounts of potassium carbonate and the decomposition products from the indigo fusion, are precipitated and separated. The mixed caustic, after separation of the carbonate, is further evaporated, dehydrated and used for the manufacture of subsequent lots of indigo.

The sodium carbonate recovered in this manner, is so contaminated with organic matter that it is below technical or ordinary commercial grade, and, therefore, of very limited use and little value.

It is an object of this invention to provide an improved process for reducing the caustic soda content of mixed caustic residues. Another object is to provide a process which will produce a more valuable by-product in the manufacture of indigo than that heretofore obtained. Other objects will appear hereinafter.

These objects are accomplished by the use of sulfur dioxide instead of carbon dioxide for treating the residual mixed caustic solutions. By our process a by-product of considerably greater commercial value is formed and, at the same time, obnoxious waste gases containing sulfur dioxide may be advantageously disposed of, and recovered caustic alkali mixture of equal or even greater purity is obtained.

In carrying out our invention, we may proceed as follows: The indigo filtrate containing approximately 16% of mixed caustic in the ratio of 50% caustic potash to 50% of caustic soda is treated with a gas containing sulfur dioxide, either by bubbling the gas through the liquid, countercurrent spraying of the liquid into the gas, or other means until a test portion when evaporated to about 50° Bé., cooled to about 46° C. and filtered shows that the ratio of mixed caustic has been changed to 40% of caustic soda and 60% of caustic potash. The solution is then evaporated to about 50° Bé., and cooled to 40° C. The sodium sulfite precipitates, and is separated from the mixed caustic by any suitable method (filtration or decantation). The mixed caustic solution is then further concentrated and dehydrated in a direct fired pot, or by other means, and is put back into the process.

Sodium sulfite is practically insoluble in mixed caustic of 50° Bé. concentration and at a temperature no higher than approximately 50° C. The final dehydrated mixture of caustic soda and caustic potash contains not more than 0.1% of sulfite calculated as sodium sulfite. In all respects the purity of the recovered mixed caustic is fully equal to, if not superior to, that recovered by the use of carbon dioxide.

The sulfur dioxide for use may be obtained from ordinary burner gases, stripped gases from liquid sulfur dioxide manufacture, tail stack gases from sulfuric acid manufacture, or the liquefied gas may be used.

The sulfur dioxide may be introduced with satisfactory results, at any time after the caustic mixture has been put in solution, in the latter stage of the indigo process. Any suitable means of contact between the sulfur dioxide and the mixed caustic solution may be used which is ordinarily used to contact a liquid with a gas, such as, for example, bubbling through an open end, filtros or multiple jet distributor, mechanical disc spraying of the liquid into the gas, etc.

The minimum ratio to which the caustic soda in the mixed caustic filtrate can advantageously be reduced by a single treatment with sulfur dioxide is about 25% caustic soda to 75% caustic potash. Below this ratio of caustic soda, the precipitated sodium sulfite becomes so voluminous when the solution is evaporated, that it becomes practically impossible to handle the mass; that is, the proportion of solids becomes so large that it will not flow. However, if it is desired to reduce the caustic soad below the 25—75 ratio referred to above, the mass may be diluted with filtered 50° Bé. mixed caustic from previous treatments, as the precipitated sulfite becomes troublesome. Instead of a mixed caustic solution, a concentrated solution of pure caustic potash may be used for dilution. It is thus possible by treatment of the filtrate with sufficient sulfur dioxide and proper dilution, or by a stepwise treatment, evaporation and filtration, to reduce the caustic soda considerably below this 25—75 ratio, or even, by proper dilution with a pure concentrated caustic potash solution, to remove it practically completely. The concentration of the treated filtrate by evaporation may also be varied somewhat to suit conditions.

The crude separated sodium sulfite, containing small amounts of potassium sulfite, occluded caustic, and other impurities may, for some purposes, be used without purification, or it may be partly purified by washing, depending on what purpose it is to be used for. A practically C. P. product can be obtained by recrystallization.

Unlike the by-product carbonate of the old process, which is a slimy almost amorphous mass, difficult to filter and wash, the sulfite obtained in the present process is quite coarsely crystalline and can be quickly and thoroughly washed on a filter. Its market value is considerably higher than that of a corresponding grade of sodium carbonate.

Although the process has, for the sake of convenience, been described in connection with the manufacture of indigo, it should be understood that we do not confine ourselves to mixed caustic solutions from this source, and that the process is equally applicable to any solutions of mixed caustic soda and caustic potash irrespective of its source, as for example, the waste caustic obtained from the fusion of various anthraquinone compounds in the manufacture of vat dyes. Since, as indicated, many widely different embodiments of this invention may be made without departing from the spirit and scope thereof, it is to be understood that we do not limit ourselves to the specific embodiments thereof except as defined in the following claims:

We claim:

1. A process of removing caustic soda from a mixture thereof with caustic potash, which comprises treating a solution of the mixed caustic with sulfur dioxide and separating the sodium sulfite which forms.

2. A process of removing caustic soda from a mixture thereof with caustic potash, which comprises treating with sulfur dioxide a solution of the by-product mixed caustic obtained in the manufacture of a dye, and separating the sodium sulfite which forms.

3. A process of removing caustic soda from a mixture thereof with caustic potash, which comprises treating with sulfur dioxide a solution of the by-product mixed caustic obtained in the manufacture of indigo, and separating the sodium sulfite which forms.

4. A process of removing a portion of the caustic soda from a mixture thereof with caustic potash, which comprises treating with sulfur dioxide an aqueous solution of the by-product mixed caustic obtained in the manufacture of indigo, and separating the sodium sulfite which forms.

5. In a process for the manufacture of indigo by fusing a mixture of sodium and potassium salts of phenylglycine with sodamide and a mixture of sodium and potassium hydroxides to form indoxyl, drowning and filtering, the step which comprises treating the by-product solution of mixed caustic with a regulated amount of sulfur dioxide, separating the sodium sulfite formed, and dehydrating the mixed caustic residue before re-using it in the operation.

6. In a process for removing caustic soda from a mixture thereof with caustic potash, the step which comprises treating an aqueous solution of the mixed caustic with a regulated amount of sulfur dioxide, diluting the solution with mixed caustic solution, and separating the sodium sulfite.

7. In a process for removing caustic soda from a mixture thereof with caustic potash, the step which comprises treating an aqueous solution of the mixed caustic with a regulated amount of sulfur dioxide, diluting the solution with caustic potash solution, and separating the sodium sulfite.

8. In a process for removing caustic soda from a mixture thereof with caustic potash, the step which comprises treating an aqueous solution of the mixed caustic with sulfur dioxide until the ratio of caustic soda to caustic potash is not less than about 1:3 and separating the sodium sulfite from a mixed caustic solution maintained at a concentration and temperature at which the sodium sulfite is substantially insoluble.

9. In a process for removing caustic soda from a mixture thereof with substantially the same amount of caustic potash, the step which comprises treating an aqueous solution of the mixed caustic with sulfur dioxide until the ratio of caustic soda to caustic potash is reduced to approximately 40% caustic soda to 60% caustic potash, evaporating the solution to about 50° Bé., cooling to approximately 40° C., and then separating the precipitated sodium sulfite.

C. JULIAN AYDELOTTE.
WALDO R. CAVERLY.
WALTER H. WRIGHT.